Sept. 15, 1953     E. A. WEAVER     2,651,939
APPARATUS FOR MEASURING THE CONTENTS OF LARGE TANKS
Filed Dec. 27, 1948     3 Sheets-Sheet 1

Inventor
Eastman A. Weaver
by Roberts, Cushman & Grover
Att'ys.

Sept. 15, 1953     E. A. WEAVER     2,651,939
APPARATUS FOR MEASURING THE CONTENTS OF LARGE TANKS
Filed Dec. 27, 1948     3 Sheets-Sheet 2

Inventor
Eastman A. Weaver
by Roberts, Cushman & Grover
Att'ys.

Sept. 15, 1953 E. A. WEAVER 2,651,939
APPARATUS FOR MEASURING THE CONTENTS OF LARGE TANKS
Filed Dec. 27, 1948 3 Sheets-Sheet 3

Inventor
Eastman A. Weaver
by Roberts, Cushman & Grover
Att'ys.

Patented Sept. 15, 1953

2,651,939

UNITED STATES PATENT OFFICE 2,651,939

APPARATUS FOR MEASURING THE CONTENTS OF LARGE TANKS

Eastman A. Weaver, Winchester, Mass., assignor to Comstock & Wescott, Inc., Cambridge, Mass., a corporation of Massachusetts Application December 27, 1948, Serial No. 67,517

5 Claims. (Cl. 73—301)

This invention relates to gages for measuring the contents of large tanks such as are used for the storage of gasoline, liquid fuel and the like.

When such tanks are used to store oils and the like water-immiscible liquids, it is the usual practice to maintain a layer of water on the floor or bottom of the tank, and since the floor is seldom perfectly tight, the water serves to supply seepage and collects sludge which may settle to the bottom. Water often enters due to condensation or imperfect coverage against snow and rain and hence usually is present to provide an under layer even though not desired. To limit the escape of volatile constituents, such tanks are provided with floating roofs or other covers which form an enclosure, the pressure in which varies from slightly more to slightly less than that of the ambient atmosphere.

In measuring the contents of such tanks, two forms of gages are in common use, viz., a float to indicate the top level of the liquid, usually with a line running over a pulley to afford an outside reading, and, alternatively, a pressure gage connected to piping attached near the bottom of the tank to read the hydrostatic pressure, often with the aid of compressed air for balancing. The latter method gives a correction for the temperature and density of the liquid, but no corrections are made by either method for the temperature of the tank walls, the gaseous pressure over the contents, or the water level underlying the contents.

The principal objects of the present invention are to provide a remote-reading gage system which is efficient and reliable in operation and highly accurate, automatically correcting for the usual errors due to the above-mentioned factors, and to provide a gage system having parts which may be readily removed for checking, adjustment, repair, etc., and easily replaced, and which does not require expensive auxiliary service such as a compressed air supply.

Further objects will be apparent from a consideration of the following description and the accompanying drawings, wherein.

Figure 1:
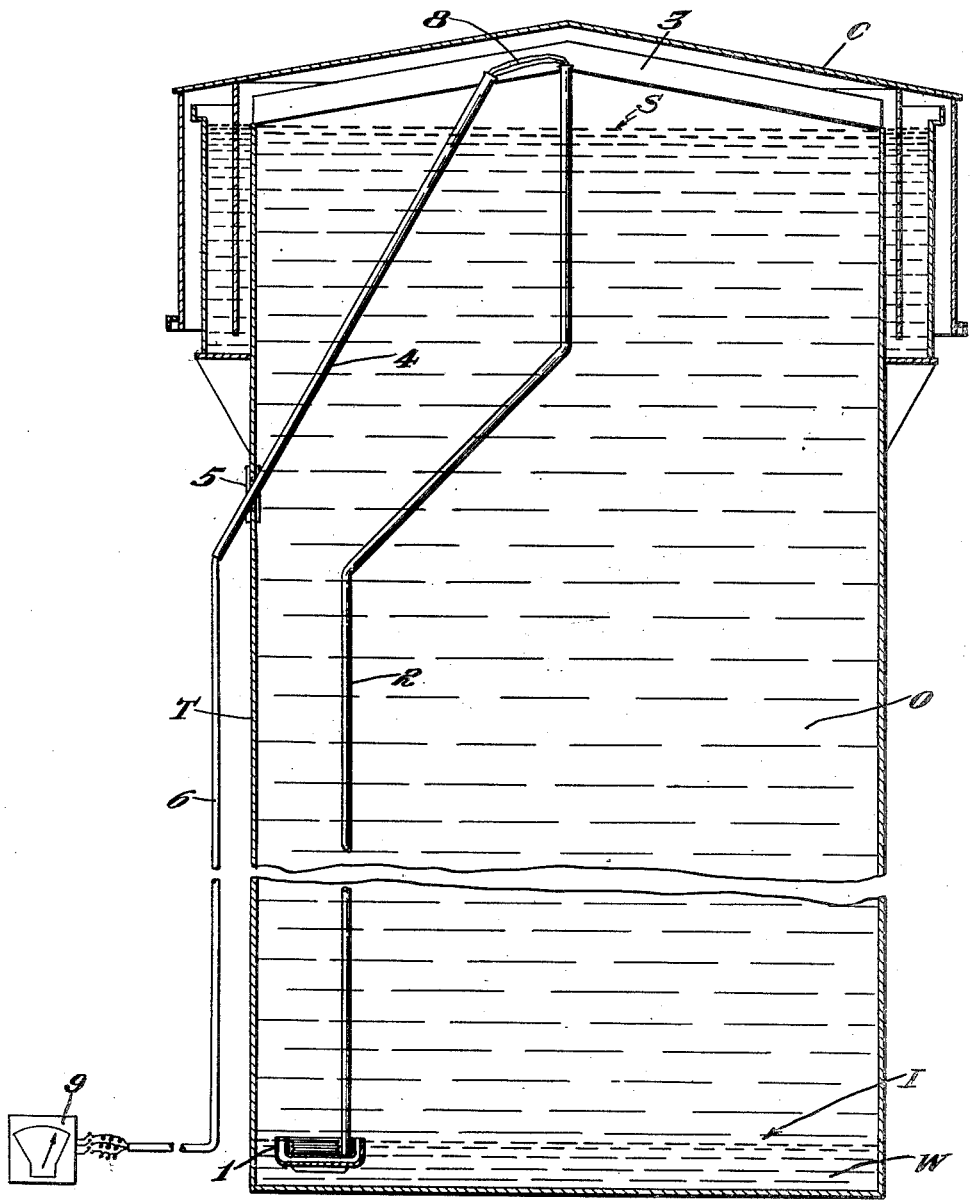
Fig. 1 is a vertical section through a storage tank equipped with a gage system embodying the present invention.

In accordance with the present invention my gage system comprises a fluid-tight enclosure or "pick-up" which includes a deformable member capable of undergoing deformation in response to changes in pressure between the interior and the exterior of the enclosure, and either carried by or otherwise associated with the deformable member is an electrical element connected in a circuit and capable of effecting variations in the electrical characteristics of the circuit in response to deformation of the deformable member. The preferred electrical element is a so-called strain gauge such as is shown in U. S. Patents Nos. 2,292,549, granted August 11, 1942, and 2,322,319, granted June 22, 1943, these elements comprising very thin electrical resistance grids which are tightly cemented or bonded to the deformable member, the strain being indicated by a variation in the resistance due to stretching or compression of the deformable member or carrier on which the grid is integrally mounted, which variations are measured with extreme precision by electrical amplification in the manner described in the above-mentioned patents.

In its preferred form the apparatus includes a pressure pick-up comprising two spaced relatively inflexible plates, at least one of which is adapted to be exposed externally to the hydrostatic pressure of the liquid within the tank, the plates being connected peripherally by a flexible fluid-tight bellows or the like element and maintained in spaced relation by a gage-carrying member capable of undergoing some degree of deformation in response to a pressure differential between the interior and exterior of the enclosure defined by the plates and bellows.

The enclosing bellows may be of metal, although more flexible sheet materials such as plastic sheetings and synthetic rubber will often be found preferable. The gage-carrying member may be of metal which is preferably very thin and bent to tubular or semi-tubular shape for rigidity in the cases where only moderate precision is needed; but where a high degree of precision is desired, a gage-carrying member, made from a relatively resilient and elastic composition, such as rubber and the like elastomers, is advisable. However, such materials often lack the necessary degree of elastic recovery and hence do not always return to the same initial dimension after being stretched, and in such cases provision must be made for periodically checking the zero-reading of the pressure pick-up.

In order to correct for the pressure of the air or vapor over the liquid, the interior of the bellows is connected by a flexible tube to the overlying vapor space, and this tube may also carry the insulated electrical leads constituting a part of the pick-up circuit. The tank wall temperature correction may be made by locating the pressure pick-up sufficiently close to the tank wall to have virtually the same temperature, and the end plates and bellows of the pressure pick-up should be of material similar to or having substantially the same thermal expansion as the side walls of the tank so that the force exerted by the fluid pressure on the pick-up is proportional at varying temperatures to the horizontal sectional area of the tank as well as to said pressure, thus affording a true measure of the tank contents. The correction for the water level at the bottom of the tank may be made by supporting the pressure pick-up on or within a float so designed that the overall density of the float and pick-up is greater than that of the oil but less than that of the water, i. e., between 0.8 and 1.0, so that it will float when suspended in the tank at a fixed height relative to the oil-water surface, thereby keeping the pressure pick-up at or very close to the water-oil interface.

The changes in resistance in the strain gage due to the varying pressures are read electrically by a potentiometer or the like, the readings being converted into pressure values either by precise knowledge of the strain gage constants and the dimensions of the end plates and the gage-carrying member, or by actual test and calibration under known conditions. In either case, pressure values, for instance in pounds per square foot, may readily be converted to oil contents in pounds by multiplying by the base-area of the tank (inside) in square feet. This weight-calibration will remain unchanged by temperature changes or even by changes to liquids of different density, whereas a calibration in gallons or cubic feet would be upset by such changes.

Figure 3:
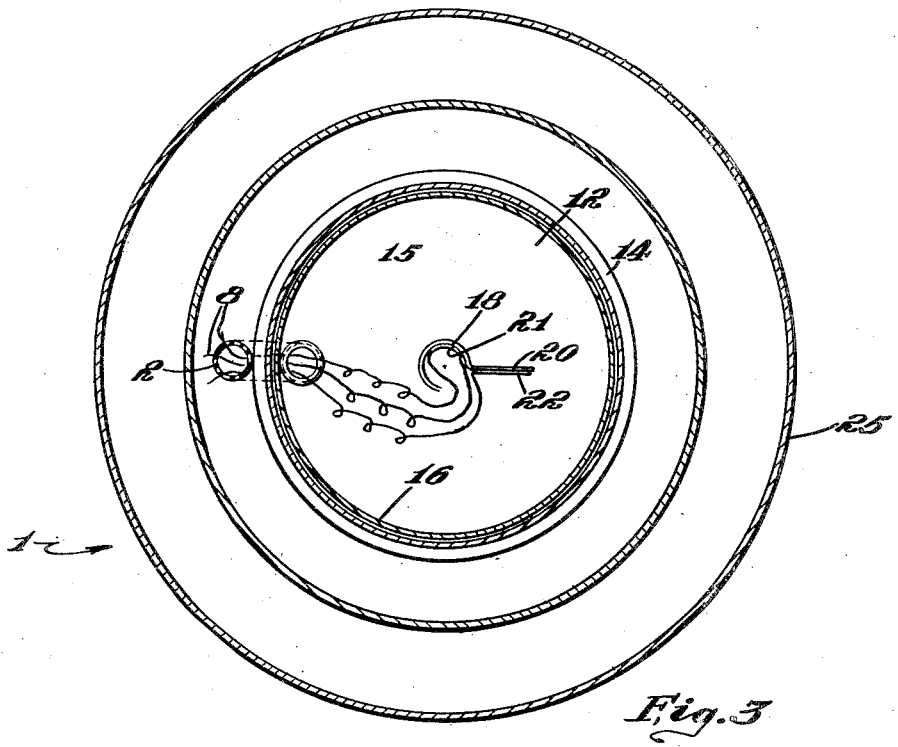
Fig. 3 is a section on the line 3—3 of Fig. 2.
Figure 2:
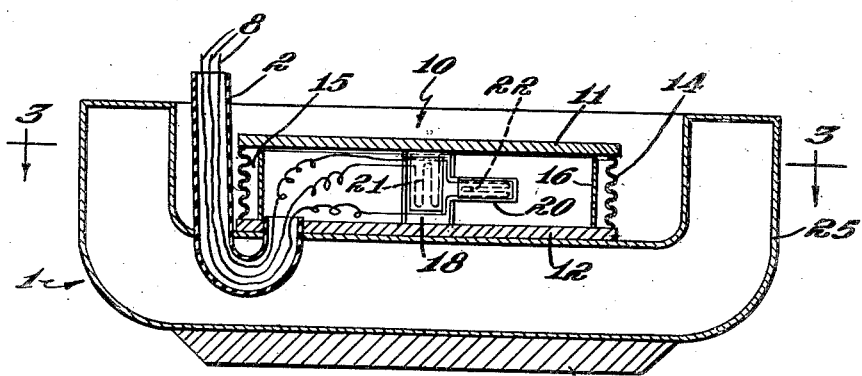
Fig. 2 is a vertical section through the float which carries the "pick-up"

Referring to Figs. 1 to 3 wherein I have shown what is now considered a preferred embodiment affording a remote-reading gage, the numeral 1 designates a pick-up which floats at the interface I between the oil layer O and the water layer W of the tank T having the usual sealed-in cover C. A flexible tube 2 of synthetic rubber or other suitable material extends from the pick-up 1 to the top of the tank T above the surface S of the oil, the upper end of the tube 2 being supported by one of the beams or structural elements 3 of the tank T. Another synthetic rubber tube 4 extends downwardly from the top of the tank through an opening 5 in its vertical wall and is connected with a conduit 6. The tubes 2, 4 and 6 carry a set of three electric leads 8 which run from a strain-gage within the pick-up 1 to a potentiometer 9 or the like device calibrated as above described. The tube 2 thus serves a double function, viz., a conduit for the leads 8 and a connection between the interior of the pressure pick-up 10 (Fig. 2) and the vapor space above the oil so that the pressure pick-up is subjected to the pressure differential between the vapor at the top of the tank and the pressure at the interface of the oil and water layers. The tube 4 should be closed against passage of air or vapor.

With the particular construction herein shown and described, it is desirable that the combined mean density of the flexible tube 2 and contents, including the lead wires 8, should closely approximate that of the oil so that the flexible tube hangs loosely in the oil without either weighing down the pick-up or buoying it up; but, alternatively, the tube 2 may be slightly denser so that a short length of it may lie on the oil-water interface so as to transmit no vertical force to the float.

The thermo-expansion of the deformable member carrying the strain-gage, as well as the temperature coefficient of the electrical resistance itself, is commonly compensated by mounting a similar (dummy) strain-gage of similar material in the same temperature region, but not subject to the same strain, and using it as another arm of the bridge connection by which changes in the strain-gage resistances are measured as an index of strain. This is the preferred method herein used, and since two resistances balanced against each other in a Wheatstone bridge always have a common terminal, only three leads need be brought out, as shown in Figs. 1 to 3. The three leads are thoroughly insulated and, as above noted, run to a single potentiometer 9 or the like sensitive meter which may be located at a point quite remote from the tank T.

Since the strain-gage resistance is of the order of 100 ohms, the added resistance due to the lead wires is not a serious problem, but since alternating current of about 1000 cycles is generally used (for reasons of easy amplification), the lead wire inductance and capacity may be of importance but can be compensated by known modifications of the balancing bridge circuit. In order to keep the long lead wires from picking up stray electro-magnetic impulses, they may be covered when outside the tank by a grounded sheath of known form.

The pick-up 10 (Figs. 2 and 3) comprises a pair of spaced, rigid metal plates 11 and 12 connected at their peripheral portions by a metal bellows 14 so as to provide a fluid-tight enclosure 15. The lower plate 12 is formed with an opening to which the lower end of the tube 8 is coupled, and within the enclosure 15 is a protective ring 16, the upper edge of which is spaced slightly from the underside of the plate 11.

Disposed within the enclosure 15 and connected to the central portion of the plates 11 and 12 is a deformable stress member 18 which consists of a strip of thin sheet metal bent to form a three-quarter cylinder or tubular column 18 and a tongue or stress-free extension 20 which projects laterally at right angles to the edge of the body portion 18. Mounted lengthwise on the deformable member is an electrical strain-gage 21 of the aforementioned type, and a similar strain-gage 22 is mounted on the extension 20, as shown in Fig. 2, thus providing a blank or dummy which permits compensating for the thermal expansion of the deformable member 18 and thermal changes in the resistance of gage 21. One of the leads 8 is connected to one terminal of the gage 21, another lead to one terminal of the gage 22, and the third lead is connected to a common connection between the other gage terminals.

The particular construction thus far described constitutes the "pick-up" per se which is supported by a dish-shaped float 25 which may be of copper or the like corrosion-resisting sheet metal. Attached to the bottom of the float 25 is a piece of iron, steel or other magnetic material 26 which tends to maintain the float adjacent to the vertical wall of the tank. As above noted, the overall density of the float 25, magnetic element 26 and pick-up 10 is slightly less than the density of water but sufficiently greater than that of oil so that the entire device floats substantially at the oil-water interface, as illustrated in Fig. 1. The hydrostatic pressure exerted on the plate 11 by the oil causes the member 18 to undergo a degree of deformation corresponding to the weight of oil in the tank, and such deformation affects the strain-gage 21 so as to vary the electrical characteristics of the circuit comprising the leads 8, potentiometer 10 and strain gages 20 and 22, as above explained. Thus, the contents of the tank T may be gaged with extreme accuracy.

Figure 4:
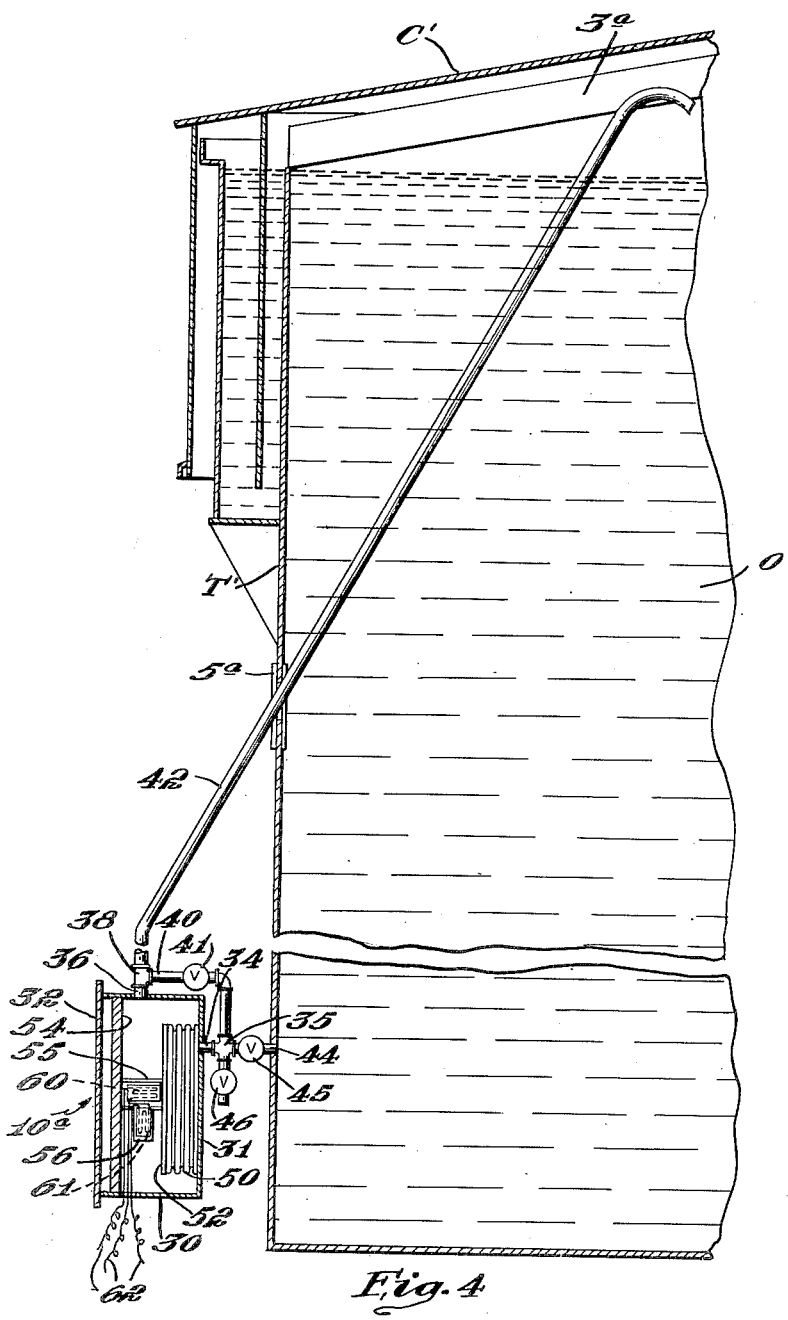
Fig. 4 is a vertical section through a tank equipped with a gage system of modified construction.

Various simplifications of the arrangement shown in Figs. 1 to 3 are possible where all of the aforementioned requirements need not be met. For instance, where no water-layer is present, or where the water-level can be adjusted to a fixed position, the arrangement shown in Fig. 4 may be used, in which case the pressure pick-up 10ᵃ is preferably disposed outside of and relatively close to the tank wall if correction for wall temperature is to be made. This arrangement is, in principle, similar to that above described, and comprises a box-like protective housing or shell having walls 30 and 31 and a removable cover 32. The end wall 31 is provided with an opening which receives a nipple 34 connected to one branch of a cross 35, and the upper part of the wall 30 is also provided with an opening which receives a nipple 36 connected with one branch of a T 38. Another branch of the T 38 is connected by a pipe line 40 which contains a valve 41 to the second branch of the cross 35, and the remaining branch of the T 38 is connected to a conduit 42 which extends through the opening 5ᵃ in tank T' to the upper part of the tank above the level of liquid therein, being supported by the beam 3ᵃ, as in the previously described embodiment. The third branch of the cross 35 is connected to the lower part of the tank T' through a short line 44 which includes a valve 45, and the remaining branch of the cross 35 is connected to a valve 46 which opens to the atmosphere.

Surrounding the end of the nipple 34 within the housing is a bellows 50 having one end secured to the wall 31 and the other end connected to a movable plate 52 so as to provide a fluid-tight enclosure in direct communication through nipple 34, valve 45 and line 44 with the interior of tank T'. Mounted in spaced relation to the cover 32 is a fixed plate or yoke 54, and between and in contact with the yoke 54 and the movable plate 52 is a deformable gage-carrying member 55 having an extension 56, this member and extension being of the same general shape as that of the above-described embodiment, but preferably made of an elastomer such as polyvinylidene chloride or the like flow-resistant material.

Mounted on the body of the member 55 is a strain-gage 60 of the aforementioned type and a similar or dummy gage 61 is mounted on the extension 56. Lead wires 62 are connected to one end of each gage and a common connection at their other ends, and these lead wires run to a potentiometer or the like device, as in the previously described embodiment.

In normal operation the valves 41 and 46 are closed but valve 45 is open to transmit pressure to the interior of the bellows 50 so as to act on the plate 52. The interior of the housing is connected by the line 42 to the upper part of the tank so that the pressure therein is transmitted to the housing to act on the other face of the plate 52. The effective pressure differential thus acts on the strain-gage to produce a relatively accurate reading of the contents of the tank.

This simplified form of tank gage is particularly desirable when frequent zero-readings are desired, to check whether its correctness has been impaired by some change such as a flow or permanent set in the member on which the strain-gage is mounted. To this end the valve 45 may be closed and the valve 46 opened to drain the lines associated with the cross 35. Thereafter the valve 46 is closed and the valve 41 is opened, thus permitting the same pressure to act on both sides of the plate 52. In this way the zero reading can readily be checked and fixed and any deviation from the true reading can be corrected by a calibration constant or by electrical adjustments at the location of the potentiometer.

Another advantageous feature of the simplified form of apparatus is that the strain gages are within a housing located outside the tank, and since this housing is provided with a removable cover 32, the parts within the housing are readily accessible for periodic checking, repair and replacement.

While I have shown and described different desirable embodiments of the invention, it is to be understood that this disclosure is for the purpose of illustration and that various changes and modifications may be made without departing from the spirit and scope of the invention as set forth in the appended claims.

I claim:

1. A device for measuring the difference in pressure between two fluids, comprising a fluid-tight enclosure including spaced plates of a material having substantially the same coefficient of expansion as the container holding the fluids, said enclosure having means for admitting one of said fluids and adapted to be surrounded by the other, a deformable member including an impedance element attached to said plates so as to undergo deformation in accordance with the difference in pressure between the two fluids, an electrical circuit connected to include said impedance element so that its electrical characteristics vary in accordance with the deformation of said deformable member, means for measuring the variations in impedance in said circuit, and a float for supporting said fluid-tight enclosure, the mean density of said float and enclosure being less than that of the denser of said fluids and greater than that of an underlying liquid.

2. A gage for measuring the difference in pressure between two fluids, comprising a fluid-tight enclosure including spaced plates of a material having substantially the same coefficient of expansion as to the container holding the fluids, said enclosure having means for admitting one of said fluids and adapted to be surrounded by the other, a deformable member secured within said plates so as to undergo deformation in accordance with the difference in pressure between the two fluids, an electrical circuit including an impedance element attached to said deformable member so that its electrical characteristics vary in accordance with the deformation of said deformable member, means for measuring the variations in electrical characteristics in said circuit, and a float supporting said enclosure and associated parts, the mean density of said float, and parts carried thereby being less than that of water and greater than that of oil.

3. A gage for determining the contents of a tank or the like vessel, comprising spaced plates of a material having substantially the same coefficient of expansion as the walls of said tank or vessel, flexible means extending from one plate to the other and defining therewith an enclosure, a conduit for connecting the interior of said enclosure with the vapor space above the liquid in said tank or vessel, a deformable member within said enclosure for maintaining said plates separated, a strain-gage secured to said member, an electrical circuit connected to include said strain-gage so that its electrical characteristics vary in accordance with the strain on said member, means for measuring the variations in electrical characteristics in said circuit, a float supporting said gage, and a magnetic member carried by said float and operative to hold said float adjacent to the wall of a steel tank in which the gage is submerged, the mean density of said float, magnetic member and gage being less than that of water and greater than that of oil.

4. Apparatus for determining the contents of a tank or the like vessel, comprising a float adapted to be submerged in a tank containing a liquid, a gage supported by said float, said gage including spaced plates of a material having substantially the same coefficient of expansion as the walls of said tank or vessel, flexible means extending from one plate to the other and defining therewith an enclosure, a deformable member within said enclosure for maintaining said plates separated, a strain-gage secured to said deformable member, said strain-gage being connected in an electrical circuit whose characteristics vary in accordance with the strain on said deformable member, means for measuring the variations in the electrical characteristics of said circuit, and a conduit connecting the interior of said enclosure with the space above the liquid in the tank in which the float is submerged, the mean density of said float and associated parts being between 0.8 and 1.0.

5. Apparatus for determining the contents of a tank or the like vessel, comprising a dish-like float adapted to be submerged in a tank containing a liquid, a gage supported by said float, said gage including a pair of spaced plates of a material having substantially the same coefficient of expansion as the walls of said tank or vessel, flexible means extending from one plate to the other and defining therewith an enclosure, a deformable member within said enclosure for maintaining said plates separated, a strain-gage secured to said deformable member, an electrical circuit connected to include said strain-gage so that its characteristics vary in accordance with the strain on said deformable member, means for measuring the variations in the electrical characteristics in said circuit, and a conduit for connecting the interior of said enclosure with the space above the liquid in the tank in which the float is submerged, the part of said electrical circuit between said strain-gage and measuring means extending through said conduit.

EASTMAN A. WEAVER.

References Cited in the file of this patent
UNITED STATES PATENTS

| Number | Name | Date |
| --- | --- | --- |
| 1,171,480 | Troll | Feb. 15, 1916 |
| 1,953,819 | Payne | Apr. 3, 1934 |
| 2,344,642 | Ruge | Mar. 21, 1944 |
| 2,361,738 | Bird | Oct. 31, 1944 |
| 2,405,199 | Faust et al. | Aug. 6, 1946 |
| 2,421,907 | Postlewaite | June 10, 1947 |
| 2,500,348 | De Giers et al. | Mar. 14, 1950 |
| 2,509,421 | Carter | May 30, 1950 |

FOREIGN PATENTS

| Number | Country | Date |
| --- | --- | --- |
| 663,521 | France | Apr. 9, 1929 |
| 712,923 | Germany | Oct. 28, 1941 |
| 559,149 | Great Britain | Feb. 7, 1944 |